United States Patent [19]
Cochard et al.

[11] 3,887,175
[45] June 3, 1975

[54] QUINIDINE ALGINATE AND PROCESS OF PREPARATION THEREOF

[75] Inventors: Pierre E. Cochard; Roger Vandecauter, both of Brussels, Belgium

[73] Assignee: Laboratoires G.-A. Cochard, Brussels, Belgium

[22] Filed: Nov. 16, 1971

[21] Appl. No.: 199,219

[30] Foreign Application Priority Data
Nov. 19, 1970 Belgium .............................. 96.509
Nov. 8, 1971 Belgium .............................. 110.261

[52] U.S. Cl. ........................... 260/209.6; 424/180
[51] Int. Cl. ........................ A61k 27/00; C08b 19/10
[58] Field of Search ........................... 260/209.6

[56] References Cited
UNITED STATES PATENTS
3,200,110 8/1965 Gollin et al. ........................ 260/210
3,450,814 6/1969 Bechtold et al. ................... 424/180
3,525,790 8/1970 Halpern ............................. 424/180
3,538,218 11/1970 Sackler et al. ..................... 424/180

FOREIGN PATENTS OR APPLICATIONS
976,301 11/1964 United Kingdom ............. 260/209.6

OTHER PUBLICATIONS
Chemical Abstracts, Vol. 55, No. 17, page 16910 g, Aug. 21, 1961.

Primary Examiner—Ronald W. Griffin
Attorney, Agent, or Firm—Sughrue, Rothwell, Mion, Zinn & Macpeak

[57] ABSTRACT

This invention is relating to quinidine alginate as therapeutical agent having more particularly an anti-arrythmic activity, said alginate being able to be used alone or in combination with one or more other therapeutical agents and being prepared by reacting quinidine or a salt thereof with alginic acid or a salt thereof.

11 Claims, 10 Drawing Figures

QUINIDINE ALGINATE AND PROCESS OF PREPARATION THEREOF

This invention is relating to a new quinidine salt, i.e. quinidine alginate, to the preparation of said new salt and to use thereof in therapeutics.

With respect to the quinidine itself, its antiarrythmic activity is well known and has no longer to be described herein. The drawbacks of quinidine and known salts thereof, such as sulfate, are also known; they cause in particular disorders of digestive apparatus which sometimes forces the practitioner to stop the treatment.

On the other hand, alginic acid is known in relation to its gelifying properties which are widely used in industry and particularly in foodstuff field.

This invention has consequently for its object to combine alginic acid and quinidine by providing a new salt, i.e. quinidine salt, which is free from above-mentioned therapeutical drawbacks, this invention also relating to processes of preparation of said new salt and to its use in therapeutics as a new agent provided for replacing quinidine itself and known salts thereof.

Generally the process for preparing quinidine alginate can be defined as comprising reaction of alginic acid or of a salt thereof with quinidine or a salt thereof under determined conditions.

With respect to alginic acid, the latter and salts thereof are prepared from algae forming part of the family of Phaeophyceae, mainly laminaria.

Alginic acid is a polymer mainly consisting of D-mannuronic acid $C_6H_8O_6$ and of L-guluronic acid in varying proportions according to the kind of alga and the origin thereof (Coasts of Brittany, Scotland, Eire, Norway, etc.). This alginic acid and alginates will have a structure and properties which will be slightly different according to the kind of alga used for their preparation. Thus L-guluronic acid for example is sometimes entirely or substantially entirely absent.

For preparing quinidine alginate according to the invention, one essentially uses, on the one hand, the principle of acid-base equivalency and, on the other hand, the displacement of one salt by another one in equifunctional amounts the complete neutralisation thereof leads to the alone desired compound.

The molecular weight of alginic acid is a function of its polymerisation degree but the latter is in reality unknown.

On the other hand, as already mentioned, the amount of L-guluronic acid varies according to the origin of the laminaria which are productive of alginic acid.

The monomers alginic acid $(C_6H_8O_6)_2$ and sodium alginate $(C_6H_7O_6Na)_2$ will be considered so as to stoechiometrically calculate the amount of quinidine base or quinidine sulfate to be added for preparing requested quinidine alginate.

The preparation processes involved are more completely described hereinafter and reference will be also made to the annexed drawings.

In various FIGS. 2a, 2b, 3a, 3b, 4a, 4b and 5a, 5b, the abscissa gives the wave length in $cm^{-1}$, while the ordinate gives the transmission in percent.

EXAMPLE 1

Quinidine $C_{20}H_{24}N_2O_2$ (for example 2 moles; 648.8 g) is dissolved either in pure methanol (cold or heated to 50°C) to which a suitable amount of water is then added, or in a cold mixture of methanol and water having a density of about 0.838. To this solution alginic acid $(C_6H_8O_6)_2$ (for example 1 mole; 352 g) is added with good stirring, said alginic acid being insoluble in the used methanol-water mixture.

Under good stirring, the mixture is brought to gentle boiling which is maintained at reflux for about 8 hours. At the end of reaction, the reaction mixture appears to be homogeneous and opalescent. It is then allowed to stand for at least 1 night, after which the supernatant material is decanted and filtered. The filtrate is distilled until vapours reach about 72°c. The residual cloudy liquid is then evaporated under vacuum without reaching 70°C. The residue of this evaporation is dried in drying-room at 45°C, then is pulverised and washed with chloroform. The residue is again dried at 45°C and pulverised. The so obtained product still contains about 10 percent of water which could be eliminated through heating to 105°C under constant weight. All said operations must be made in absence of light.

The yield is of about 70 percent.

EXAMPLE 2

One starts from sodium alginate $(C_6H_7O_6Na)_2$ (1 mole; 396 g) and from quinidine sulfate $(C_{20}H_{24}N_2O_2)_2.H_2SO_4.2H_2O$ (1 mole; 782.96 g).

The quinidine sulfate is dissolved in water, as well as sodium alginate. Both solutions are brought together. The mixture is heated with reflux for 2-4 hours. The initial solution of reactants appears to be neutral when the combination is produced (indicator paper or pHmeter). The mixture is brought to low temperature so as to promote the complete precipitation of quinidine alginate. The latter is separated by centrifugation and washed with chloroform. This process allows to obtain a very pure salt because there remains no quinidine in the chloroform liquor. However, the evaporation residue of reaction waters still contains unreacted quinidine sulfate.

The yield is of 33-50 percent.

In place of quinidine sulfate described in Example 2, any organic or inorganic salt of quinidine which is able to produce the double decomposition reaction can be used in alcoholic or hydroalcoholic medium. In place of the sodium alginate used in Example 2 for preparing quinidine alginate, ammonium alginate or any other alginic acid derivative which is able to produce the double composition reaction with quinidine salt can be substituted for.

EXAMPLE 3

One can also start from quinidine sulfate and transform it into quinidine base with ammoniac, before to react said quinidine with alginic acid as in Example 1.
Quinidine alginate has the following characteristics:
very insoluble substance
soluble at boiling: 500 mg/100 ml (in water)
insoluble at the level of 100 mg/100 ml in:
methanol
50 percent methanol (methanol-water: 1/1)
ethanol
acetone
diethyl ether
chloroform
benzene
hydrocarbons ($C_5$–$C_6$–$C_7$)
Decomposition point with charring: 189°–193°a C
Organoleptic characteristics
1. brittle and translucent compound having the appearance of leaflets which give a powder of beige colour through grinding;
2. slightly bitter flavour.
very low vapour tension
stable in air at low and high temperature
under the action of a strong mineral base; quinidine is found again.

Figure 1:
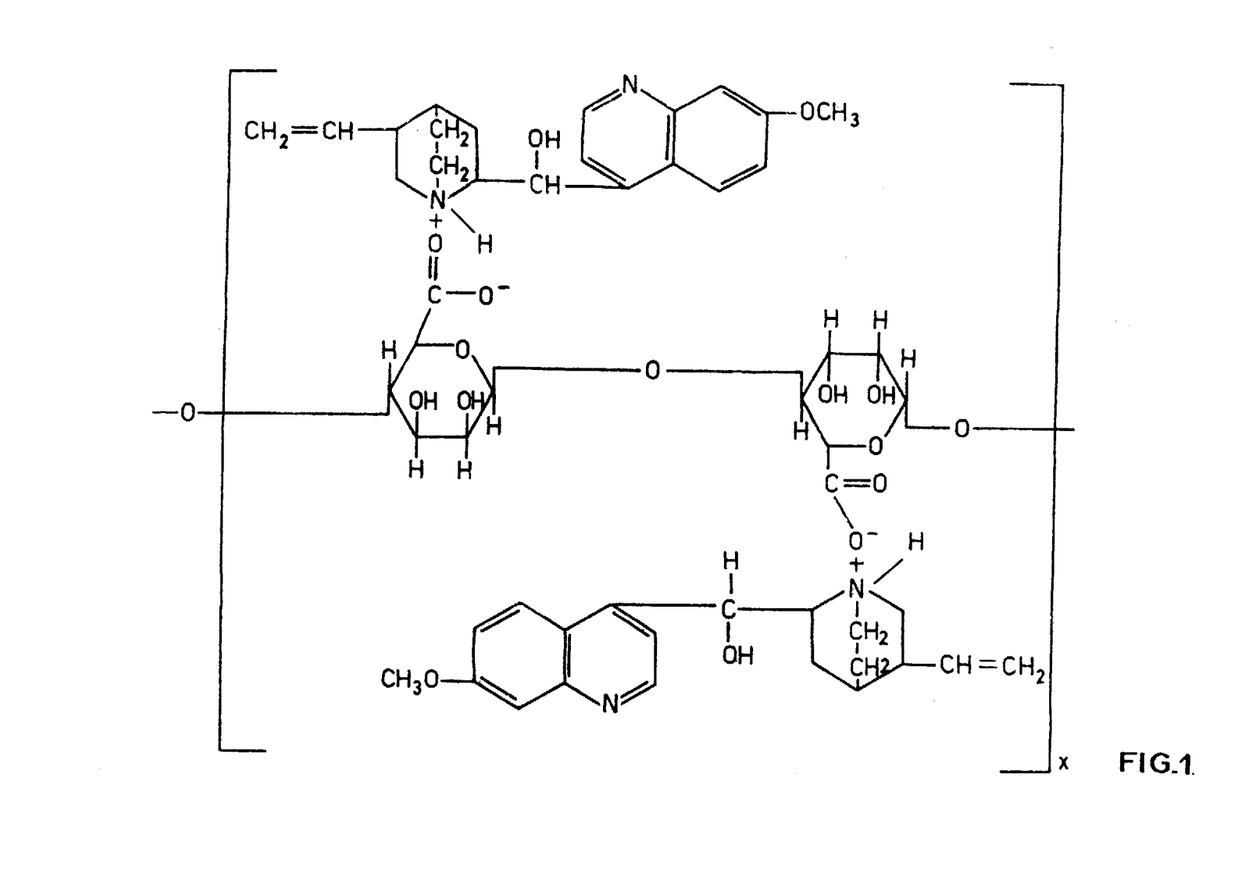
FIG. 1 presents formula of quinidine alginate with the limits made hereinafter.

If starting alginic acid is a pure polymannuronic acid, i.e. without guluronic acid (use of algae wherein alginic acid is only obtained from polymerisation of mannuronic acid), the formula of the quinidine alginate obtained is that given by annexed FIG. 1.

Figure 2A:
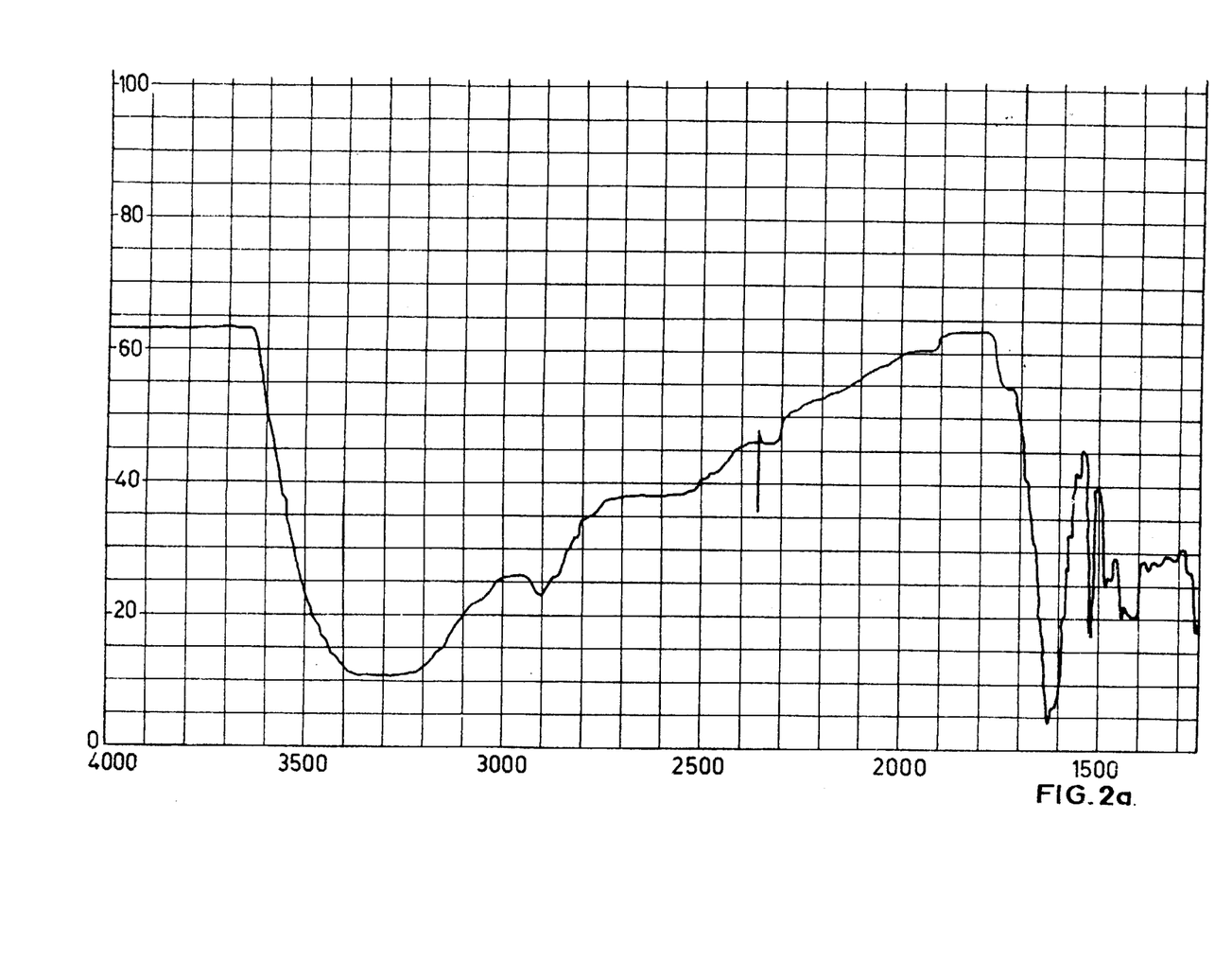
FIGS. 2a and 2b give infrared spectrum of quinidine alginate resulting from the reaction quinidine + alginic acid.
Figure 2B:
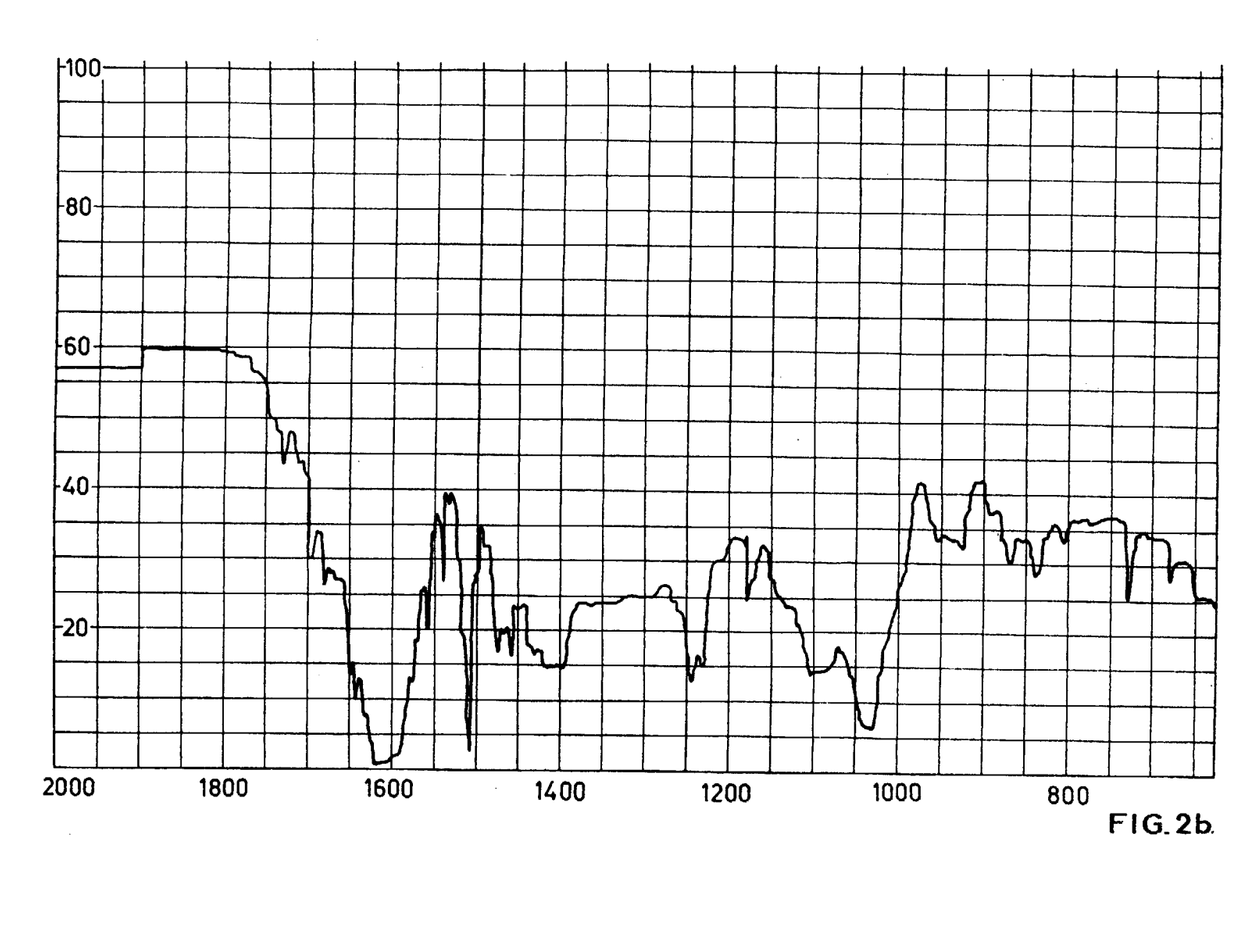
Figure 3A:
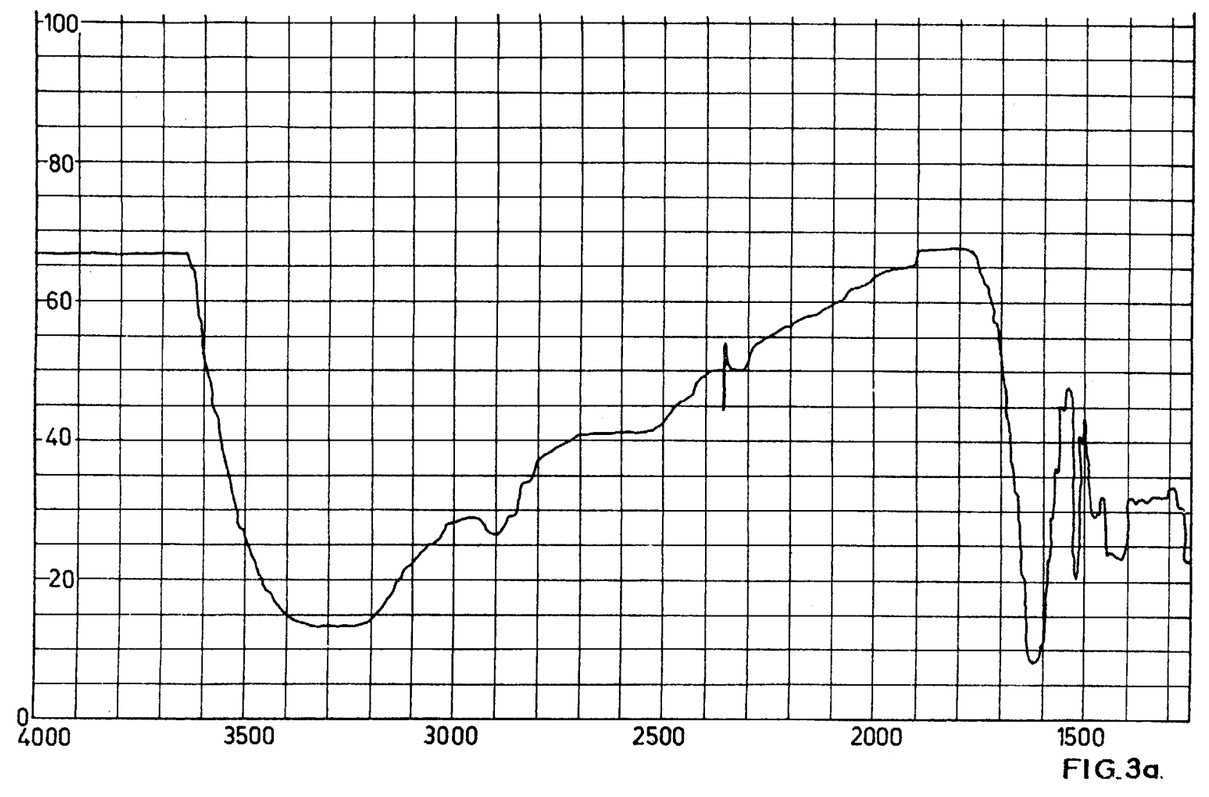
FIGS. 3a and 3b give infrared spectrum of the same quinidine alginate resulting from the reaction quinidine sulfate + sodium alginate.
Figure 3B:
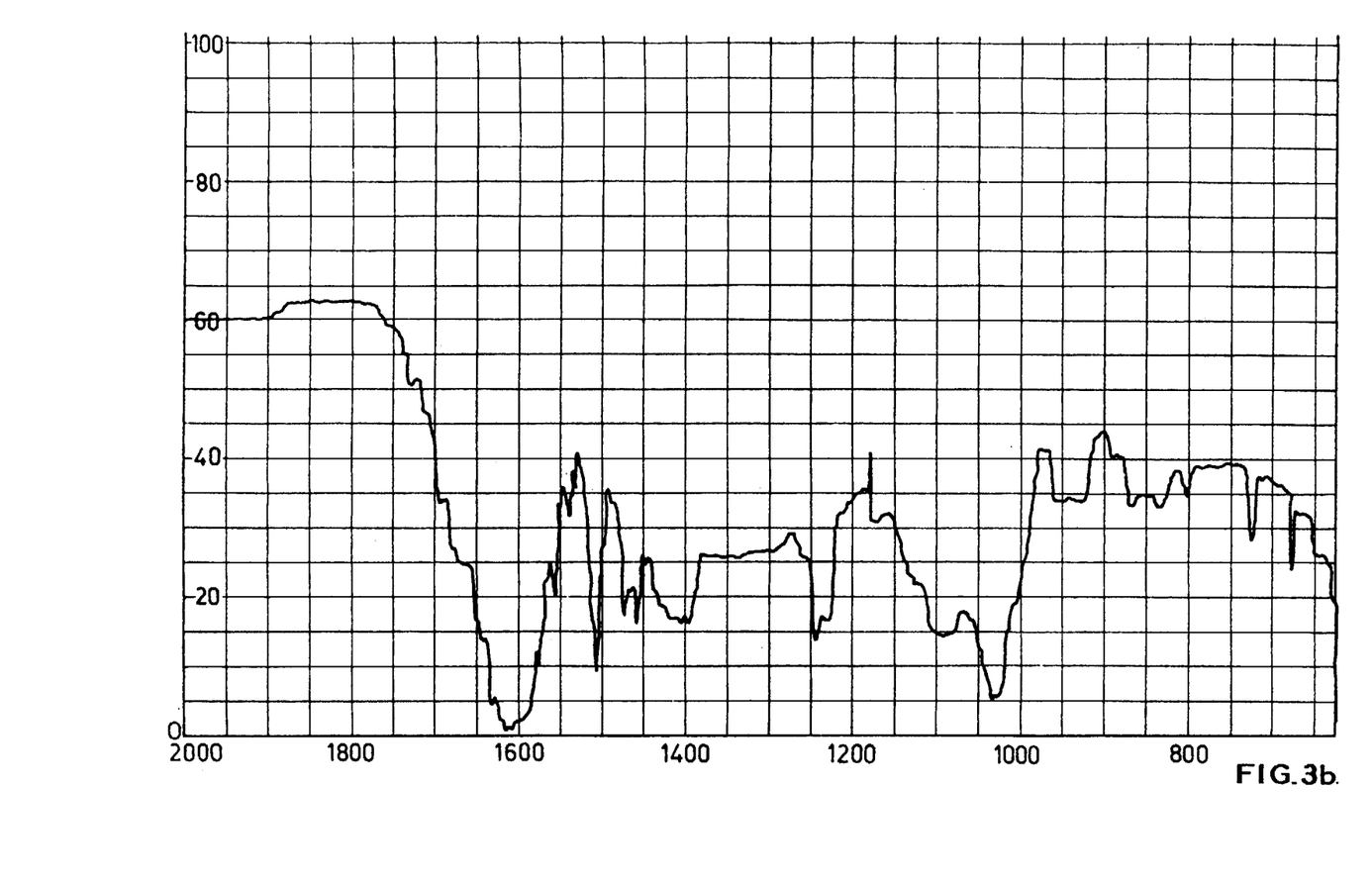

Whether the process with sodium alginate + quinidine sulfate or the process with alginic acid + quinidine is used, the same salt is obtained, i.e. quinidine alginate. The infrared spectra are similar as shown by FIGS. 2a and 2b (reaction: quinidine + alginic acid) and by FIGS. 3a and 3b (reaction: quinidine sulfate + sodium alginate). Quinidine alginate from which said spectra were obtained supposed the use of Protanal HF as sodium alginate, and of Protacid as alginic acid, both said products deriving from algae of Norwegian origin, containing a low percentage of L-guluronic acid.

Figure 4A:
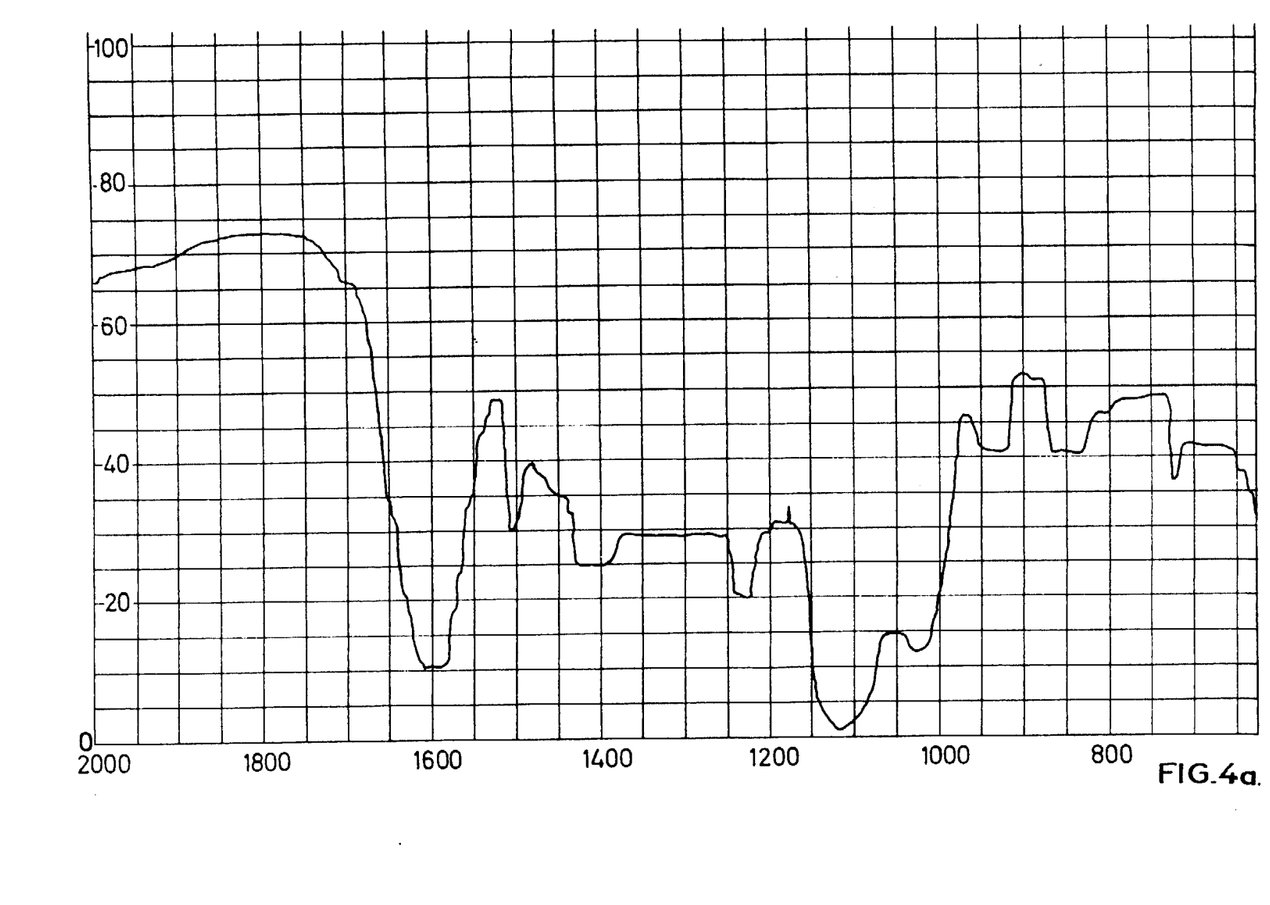
FIGS. 4a and 4b give infrared spectrum of a simple mixture of quinidine sulfate and sodium alginate.
Figure 4B:
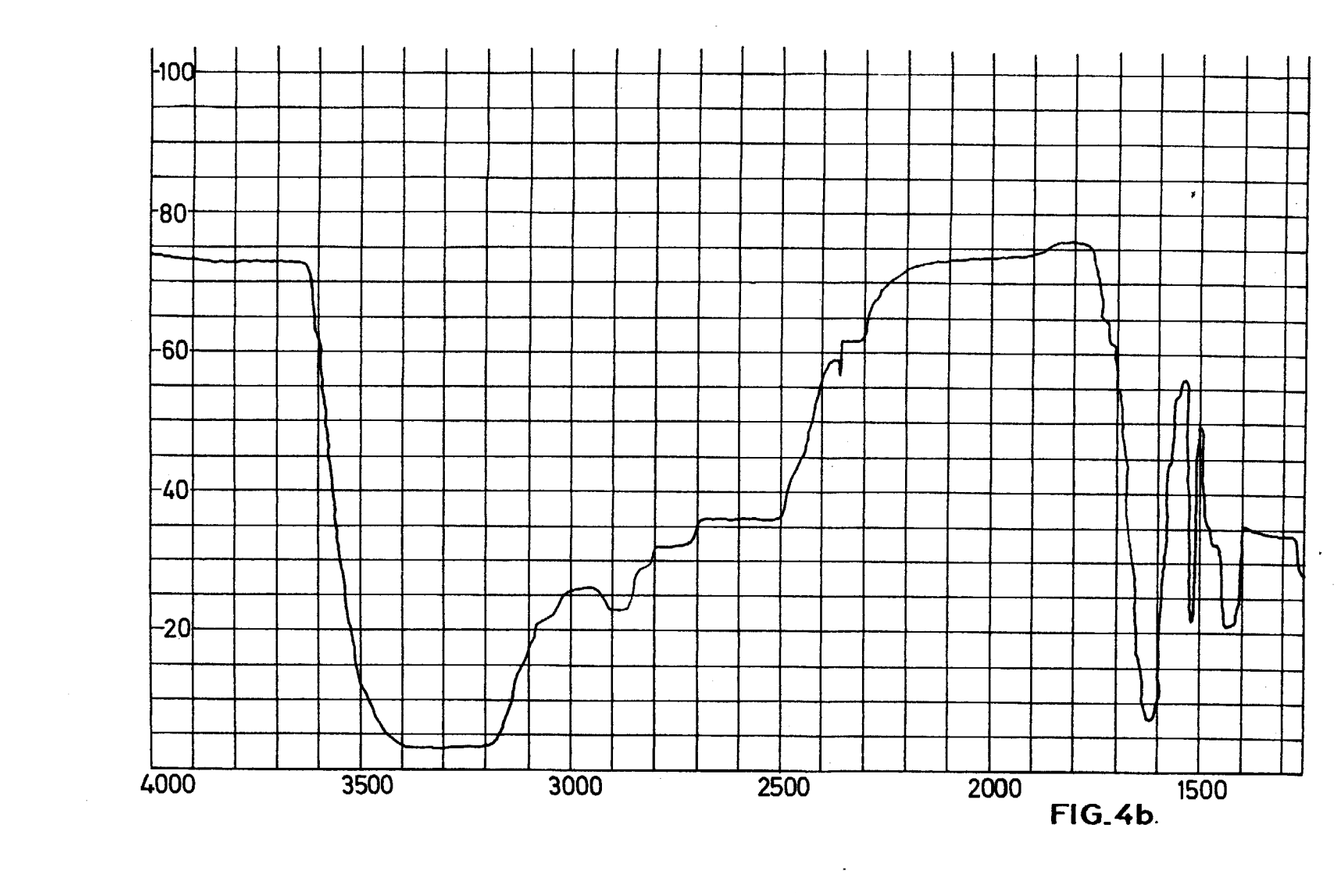
Figure 5A:
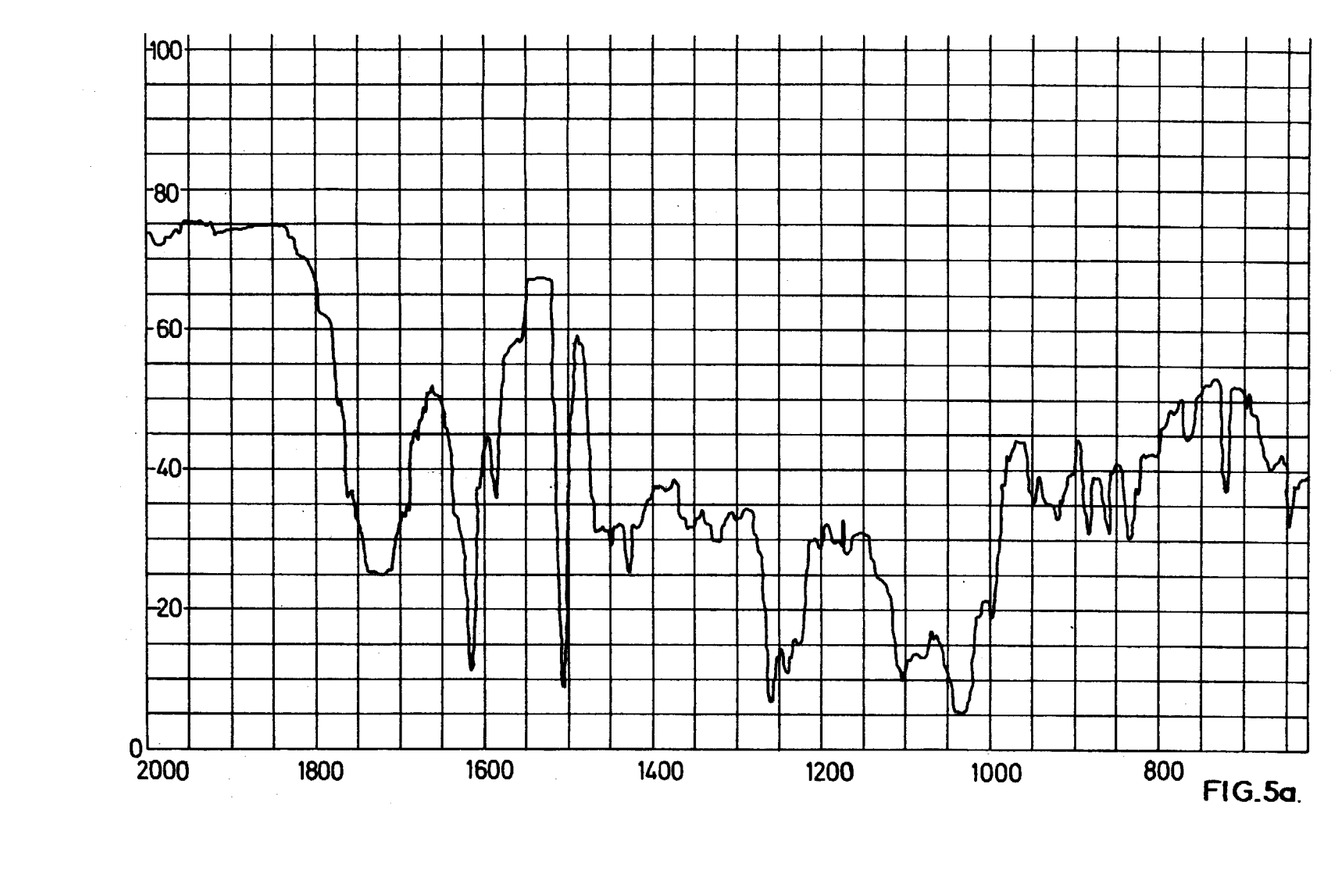
FIGS. 5a and 5b give infrared spectrum of a simple mixture of quinidine and alginic acid.
Figure 5B:
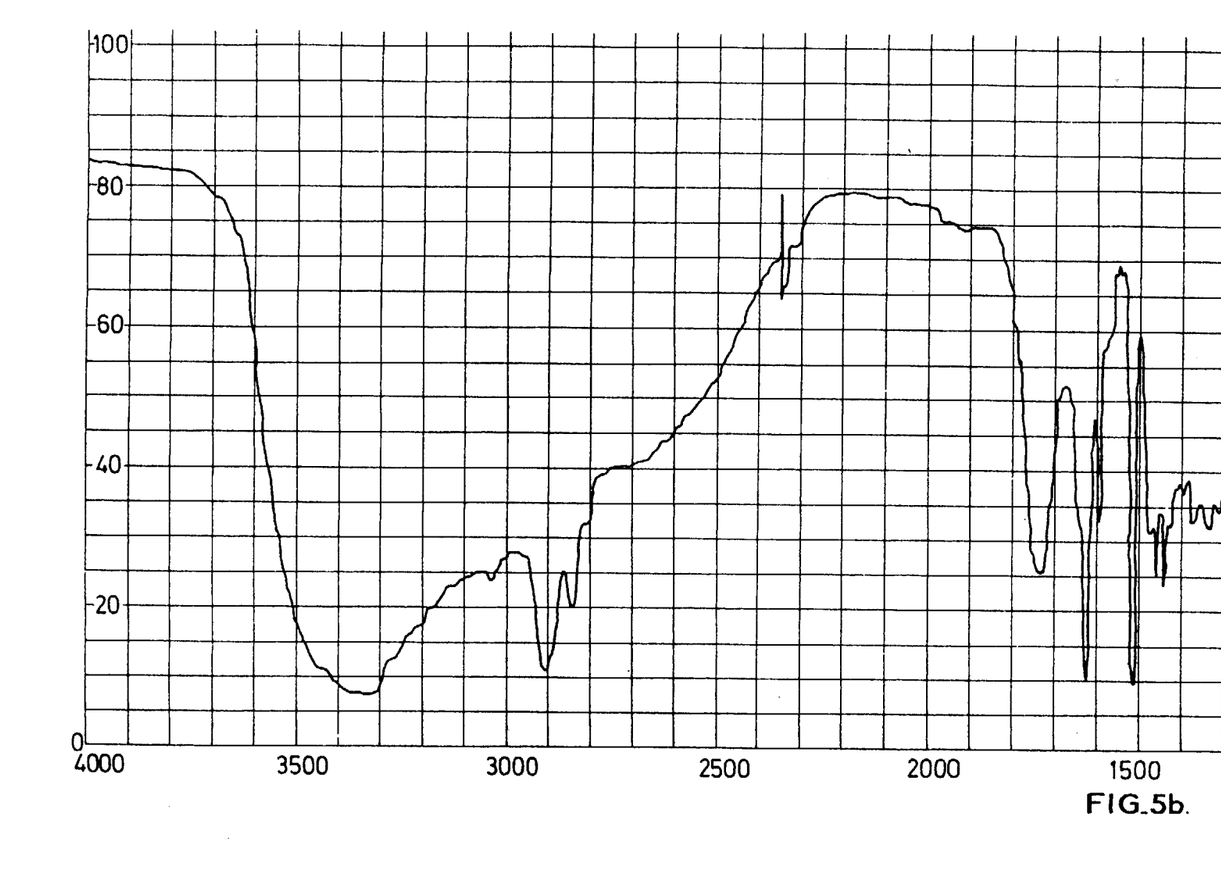

By way of comparison, reference can be made, on the one hand, to FIGS. 4a and 4b which present the infrared spectrum of a simple mixture of quinidine sulfate and of sodium alginate, and on the other hand to FIGS. 5a and 5b which present the infrared spectrum of a simple mixture of quinidine and alginic acid.

Said spectra clearly show that the reactions according to the invention give quinidine alginate the spectrum of which is different from those obtained from a simple mixture of reaction substances. Thus a new product consisting of quinidine alginate is obtained.

Quinidine alginate has the usual properties of quinidine salts (but without the hereinabove mentioned or known drawbacks thereof), i.e. its use is useful more particularly in the following conditions: paroxystic or permanent auricular fibrillation, various arrythmiae, tachyarrythmiae, extrasystoles, venticular tachycardiae.

Quinidine alginate has amongst others the advantage to have a much less pronounced bitter flavour than that of quinidine or main salts thereof, and also the advantage to present in stomach medium at 37°C a regular dissociation rate which is of course much slower than that of the known main salts of quinidine and hydroquinidine. As a matter of fact, without additives, quinidine alginate gradually liberates 85 percent of active constituent within ½ hour, 100 percent being solubilised after 1 hour.

Figure 6:
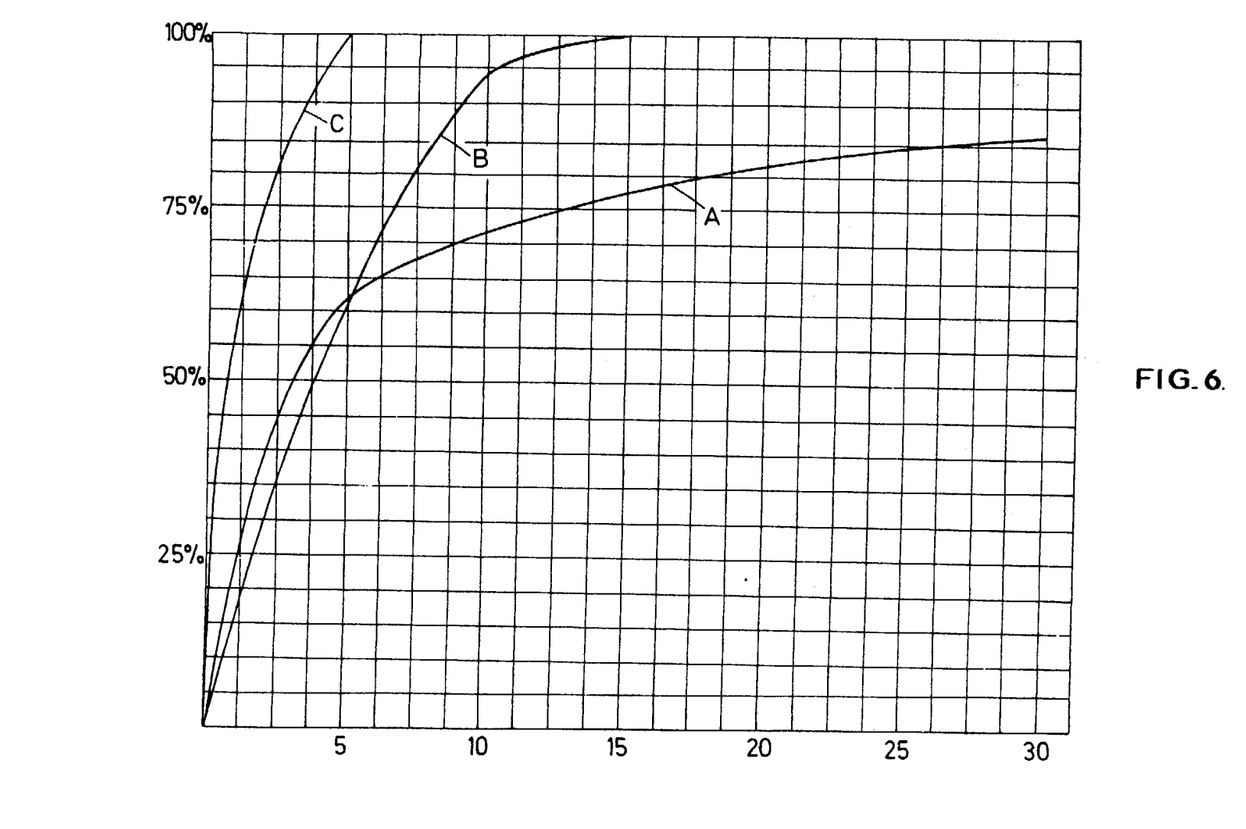
FIG. 6 is a graph giving in ordinate the percentage of dissolution and in abscisse the time in minutes, said graph giving comparative curves of dissolution in reconstituted gastric medium.

FIG. 6 gives comparative curves of dissolution in reconstituted gastric medium (percentage in ordinate) versus the time in minutes in abscissa. Curve A is that corresponding to alginate with which in reality 100 percent of dissolution is obtained after 60 minutes. Curve B corresponds to hydroquinidine hydrochloride, while curve C corresponds to quinidine polygalacturonate and quinidine sulfate. Said curves B and C show a fast dissolution of said latter salts.

Use of quinidine alginate allows a suitable resorption of quinidine allowing a suitable use of the latter by the system without usual harmful side effects of the quinidine or known salts thereof.

Quinidine alginate can be pressed as pharmaceutical tablets or pharmaceutical more or less coated pills, the flavour of the product being less bitter than that of other known salts of quinidine. It can be granulated or directly placed in gelules or capsules by using usual galenic processes. It is compatible with neutral excipients usually used when preparing tablets, oily or alcoholic capsules and gelules. Its flavour and its stability also allow its use as oral suspension prepared according to the pharmaceutical art.

Quinidine alginate will be used as active ingredient and as essential component of drug forms, so that a suitably studied dose of quinidine base, in a tablet or gelule for example, will allow the most suitable therapeutical use of said new compound.

By taking into account of the gradual and total liberation of active ingredient and of the good tolerance of the product, the advisable unit dosage corresponds to the suitable dose of quinidine so as to obtain and maintain quinidinemy at an useful level through 2 to 8 daily uses. Said unit dosage can be of 300 mg of quinidine alginate.

We claim:
1. Quinidine alginate.
2. Process for preparing quinidine alginate, said process comprising reacting quinidine or an organic or inorganic salt of quinidine capable of undergoing the double decomposition reaction with alginic acid or a salt thereof capable of undergoing the double decomposition reaction by dissolving quinidine or the salt thereof either in methanol which is then diluted with water or directly in methanol-water; adding the alginic acid or salts thereof as a fine powder to the methanol-water solution; reflux heating the solution; allowing the reaction product to settle; filtering the methanol-water solution; and collecting a dry residue of quinidine alginate powder, all of the above process operations being carried out in the absence of light.
3. The process of claim 2 wherein following settlement of the reaction product, the methanol-water is filtered, and the filtrate is partially distilled after which the filtrate is evaporated and dry residue is collected, washed with chloroform, dried and pulverized into a light beige powder of quinidine alginate.
4. Process as claimed in claim 2, characterised in that the quinidine salt is quinidine sulfate.
5. Process as claimed in claim 2, characterised in that the alginic acid salt is sodium alginate.
6. Process as claimed in claim 2, characterised in that one starts with a quinidine salt, such as sulfate, which is transformed into quinidine base before reacting the latter with alginic acid.

7. A process for preparing quinidine alginate, said process comprising reacting quinidine or an organic or inorganic salt of quinidine capable of undergoing the double decomposition reaction with alginic acid or a salt thereof capable of undergoing the double decomposition reaction by placing quinidine or the salt thereof in a water solution; placing alginic acid or salt thereo in a water solution; combining the two water solutions; reflux heating the combined solution; allowing the reaction product to settle; and collecting a dry residue of quinidine alginate powder, all of the above process operations being carried out in the absence of light.

8. Process as claimed in claim 7, characterized in that the quinidine salt is quinidine sulfate.

9. Process as claimed in claim 7, characterized in that the alginic acid salt is sodium alginate.

10. Process as claimed in claim 7, characterized in that one starts with a quinidine salt, such as sulfate, which is transformed into quinidine base before reacting the latter with alginic acid.

11. The process of claim 7 wherein following settlement of the reaction product, the mixture is brought to a low temperature, separation is made by centrifugation and the product is then washed with chloroform.

* * * * *